No. 633,081. Patented Sept. 12, 1899.
J. E. DAUGHERTY.
FISH HOOK.
(Application filed Mar. 29, 1899.)
(No Model.)
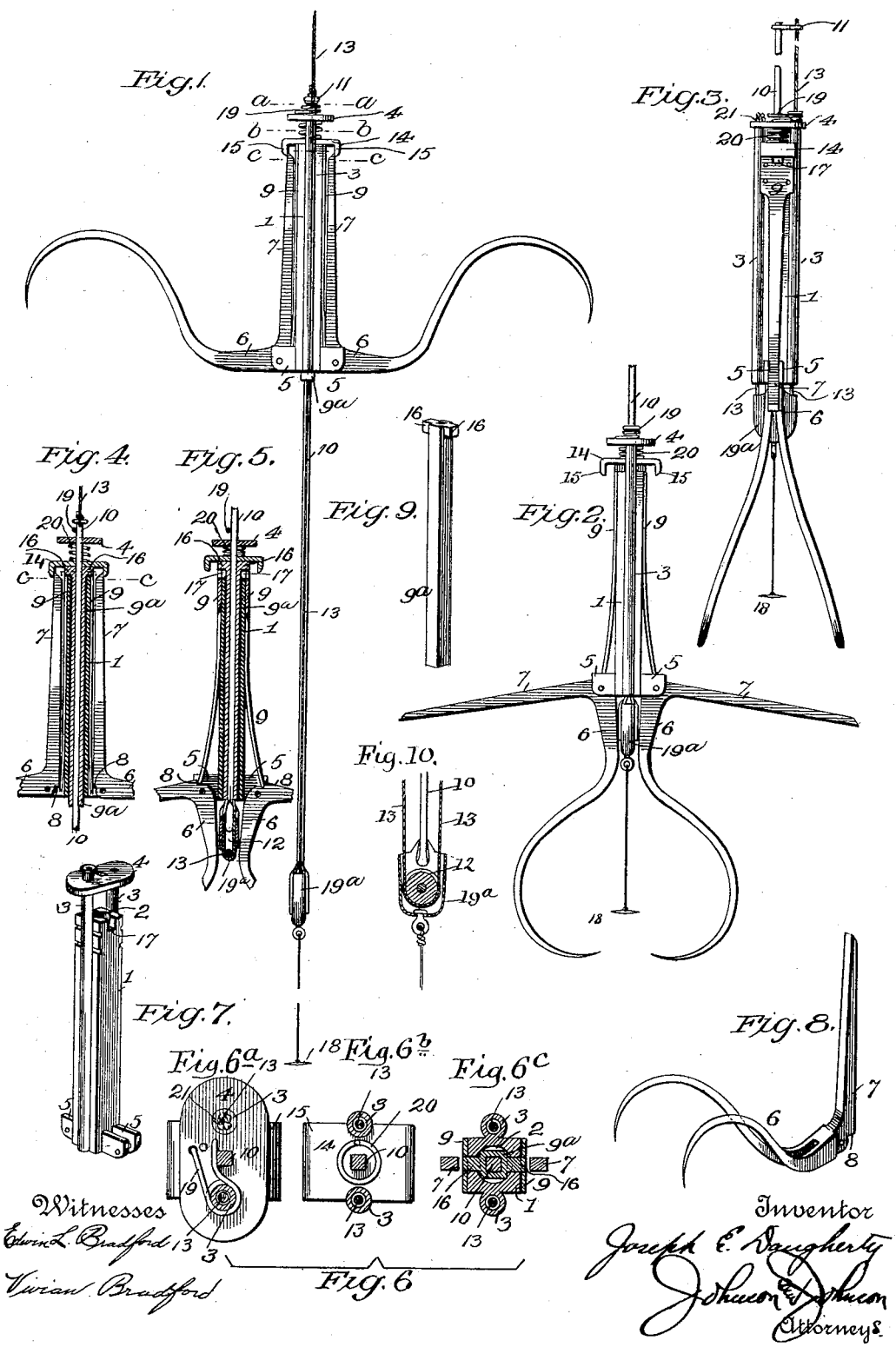
Witnesses
Edwin L. Bradford
Vivian Bradford
Inventor
Joseph E. Daugherty
Johnson & Johnson
Attorneys
THE NORRIS PETERS CO., PHOTO-LITHO., WASHINGTON, D. C.

UNITED STATES PATENT OFFICE.

JOSEPH EMERSON DAUGHERTY, OF TIFFIN, OHIO.

FISH-HOOK.

SPECIFICATION forming part of Letters Patent No. 633,081, dated September 12, 1899.

Application filed March 29, 1899. Serial No. 710,931. (No model.)

*To all whom it may concern:*

Be it known that I, JOSEPH EMERSON DAUGHERTY, a citizen of the United States, residing at Tiffin, in the county of Seneca and State of Ohio, have invented certain new and useful Improvements in Fish-Hooks, of which the following is a specification.

The particular kind of hooks to which my improvements are applied is that in which the fish is caught by and between spring-actuated hooks, which are forced together and closed with a piercing action upon the fish; and the primary feature of my invention resides in provision whereby the pulling movement of the fish after having taken the bait becomes the means by which the hooks are drawn down upon the bait-holder in position to be sprung and to seize the fish, and it is this pulling down that becomes the means of tripping and springing the hooks, the pulling movement alone of the fish effecting both these results through the instrumentality of the fish-line and its connection with the bait-holder. As a result of the fish pulling, the seizing action of the hooks is rendered independent of the bait.

The parts and combinations of parts wherein the improvements reside will be pointed out in the claims herein read in connection with the accompanying drawings, illustrating the improvements, and wherein—

Figure 1 shows the hooks as set open for use. Fig. 2 shows a like view with the hooks in their closed relation. Fig. 3 shows a side view of Fig. 2. Fig. 4 is a vertical section of the stock or body, showing the hook-arms as set. Fig. 5 is a like section of the hooks as closed. Fig. 6 shows cross-sections taken on Fig. 1, respectively, on the line $a\ b\ c$, in which Fig. $6^a$ shows the cap-plate 4 and the spring-brake 19, Fig. $6^b$ shows the coil-spring 20 on the lipped cap 14, and Fig. $6^c$ shows the rectangular form of the slide bait-rod 10 and the loosely-fitting tube $9^a$ of the stock 1, and Fig. 7 shows the body part, to which the several parts of the hook are fixed. Fig. 8 is one of the hooks, and Fig. 9 is the center tube, showing its end lugs for locking it with the body part. Fig. 10 shows the sheave on the bait-holding rod.

The body part 1 is of cast metal about two inches long, formed with a center bore 2 and tubes 3 3 on two of its sides, which extend the length of the stock or body part, and have at their upper ends a fixed cross-cap 4, through the ends of which the bores of the tubes 3 extend, Fig. 7. At its other end the body part has lugs 5 5, which project from its opposite widest sides, and between these lugs the hooks 6 6 are pivoted. These hooks have arms 7 7 at their pivot-joints, and at the junction of the arms with the shanks of the hooks is formed a shoulder 8, which stands between the lugs. A plate-spring 9 is riveted to the upper end at the flat sides of the body part and engages the shoulder 8 of the hook, pressing against it outward, so as to constantly tend to close each hook. The force of this spring against the hook-shoulder 8 tends to drive the arm down, while the body part below the hook-pivot forms a stop, Fig. 5, to limit the closing movement of the hook, so that they need not lap when closed. Each pivoted hook is bifurcated, so as to form a pair, which spread apart from the shank as they approach the points, so that they pierce the fish in opposite pairs.

The central tube of the body part contains a loosely-fitting tube 9, the bore of which is of square cross-section, Figs. 6 and 9, and which contains a slide bait-rod 10, also of square cross-section, having a length about two-thirds greater than that of the tubular body and within which it is free to slide from end to end of its length. At its lower end this rod has a swiveling bait-holder and at its upper end an eyed arm 11, which stands out from the rod in line with one of the edge tubes of the body. A sheave 12 is mounted at the lower end of the bait-holding rod, and the fishing-line 13, fastened or retained in one of the edge tubes of the body, passes through from said tube down around said sheave and up through the other edge tube and through the eye at the upper end of the bait-rod and forms the means by which the hook is caused to be operated by the pulling movement of the fish, similar to the action of a block and tackle. The inner tube stands normally even with the upper end of the body part, Fig. 4, but projects a little below its lower end, in which position it is spring-held in a way and for a purpose which I shall presently state. At the upper end of the tubular body a cap 14 rests freely and normally upon it and has lips 15 15 overhanging the wide sides of the body, and this cap is held in place on the stock between the edge tubes by the bait-rod, which passes through a square hole in it and also passes through a square hole in the fixed cap 4, Fig. 7, so that said cap cannot turn. Between these two cap-plates a coil-spring 20 is retained by the bait-rod, presses the lipped cap constantly down upon, and thereby keeps the inner tube $9^a$ projecting normally a little below the lower end of the body part, in which position it is retained by side lugs 16 16, Fig. 9, at its upper end, fitted and seated in corresponding notches 17 17 in the upper end of the body part, and by which lugs and notches the tube is locked to the body part to prevent it from turning.

When the hooks are set for use, as in Fig. 1, their arms stand up against the flat sides of the body part and engage the lips 14 of the spring-pressed cap, by which the hooks are retained in open position to be sprung to catch the fish. When the hooks are so set, the bait-rod is pushed down through the body part as far as it will go, so that the bait end of the rod will extend at least two-thirds of its length below the body part, this for an important purpose, because by it the hooks are pulled down by a block-and-tackle action on the fishing-line, as in Fig. 3.

I prefer to use a cross-pin 18 as the means for holding the bait and to attach this pin by a piece of gut string to the swivel end of the slide bait-rod. In using minnows for bait the pin is placed across its lower jaw, which gives the minnow greater freedom of movement and is not as destructive to the fish as a swallowed hook; but any desired bait can be used with the pin or other bait-holder.

To the fixed body-cap 4 a spring 19, Fig. 7, is so attached as to have a frictional bearing against the slide bait-rod 10, and the force of this frictional pressure on the said slide-rod forms a brake having a holding-force sufficient to overcome the weight of the device on the slide bait-rod which hangs from the fishing-line in the water by retaining the slide-rod in its set relation to the body part, and with the bait hanging three or four inches below the point at which the hooks when sprung will pierce the fish. When, therefore, the fish seizes and swallows the baited hook in its efforts to pull away, it will, by means of the fishing-line, thereby pull the hooks down on the slide-rod, so as to bring the fish within the piercing action of the hooks, and the lower end of the center tube $9^a$ will by the same movement come in contact with the rod-sheave, causing the tube to move up within the bore of the body part against the spindle-pressed cap and release or trip its lips from the ends of the hook-arms, when the hooks will be thrown down and pierce the fish between them, securely holding it. The ends of the arms are beveled, so that when pressed against the cap-lip 15 the cap will thereby be raised and allow the beveled ends to pass under and behind the lips to set the hooks against the force of the springs. The provision of the shoulder 8 at the pivoted end of the hook, while allowing the spring to be pressed back, also allows free force to the spring in throwing the hook when released, and for this purpose the free ends of the spring are housed between the hook-pivoting lugs. The edge tubes serves as guides for the fishing-line to keep it in proper relation to the sheave, while the latter is inclosed by a metal case $19^a$, fixed on the end of the slide-rod and which keeps the fishing-line always upon the sheave, Fig. 10.

It is important to notice that while the hooks are pivoted at the lower end of the body part, the shanks of the hooks when closed stand away from the slide-rod, Fig. 2, to allow the sheave-casing to pass between them by the pulling of the fish, which pulls the body part down until the projecting end of the tripping-tube therein is caused to strike the upper part of or an extension of the sheave-case, as in Fig. 10, and thereby cause the center tube to be slightly raised to trip or release the hook-arms. The sheave-case therefore should always stand so that its flat sides will stand between the hook-shanks when the hooks are sprung.

In order to hold the hook device on the rod on which it is caused to slide, as stated, the brake-spring 19 may be adjusted to give the required frictional pressure against the rod, so that until the fish is caught the hooks and the body part will be held by friction at the upper end of the slide-rod, as in Fig. 1; but the sliding of the hook part upon and to the lower end of the said rod is effected by the pulling movements of the fish in its efforts to get free, and which brings the hooks within their piercing sweep on each side of the fish. By this construction and the sliding movement of the hook carrying body part upon a suspended guide-rod an important advantage is gained by causing the hooks to be moved bodily when set toward the fish a considerable distance before they are sprung to catch the fish, so that the bait is comparatively far away from the hooks and there is nothing near it to frighten the fish away.

The line guide-eye at the upper end of the bait-holding rod forms a stop in setting the body part at the upper end of the rod and prevents the accidental escape of the rod from the body-bore, while the spring-pressed cap seated freely on the upper end of the center tube keeps it down below the body to receive by contact with the sheave-case the upward pushing or lifting action of the bait-holding rod for releasing or tripping the hooks as they are pulled down with the body part to effect their seizing the fish after having swallowed the bait-pin and by its pulling movements upon that end of the line which is fastened to the body part and by which the line draws upon the sheave as a fixed point. In this operation the bait-holding rod forms practically a fixed part, because it is suspended from its sheaved end by the fishing-line, the surface or controlling end of which is also fixed so that any pulling by the fish draws down the hook-carrying part upon the bait-rod.

It is important to note that the fishing-line has a fixed connection with the upper end 21, Fig. 3, of one of the body-tubes and passes from such fixed point down through the tube to and beneath the sheave of the bait-holding rod and up through the tube at the other side of the body part, and thence through the eyed arm on the upper end of said rod. This construction of body-tubes, while serving to house the line and prevent its becoming entangled with the body or hook parts, serves also the important purpose of suspending the hook device practically from the sheaved end of the bait-holding rod, through the instrumentality of the friction-holding spring, and as the means of pulling down the hook part in the manner of a block and tackle, but with a downward instead of a lifting action. The line can be used with floats in trolling and with the ordinary bank-stake lines.

While I have illustrated and described a fish-hook embodying my invention in the form at present preferred by me, I do not wish to be understood as limiting myself to the exact construction and arrangement shown and described, as such changes and modifications may be made as clearly fall within the claims and the scope of my invention and without departing from the principle or sacrificing any of the advantages thereof; nor is it intended to limit my invention to the form of square cross-section of the bait-holding rod, nor to the particular manner shown in which the stock or body part is slidably held upon the bait-holding rod.

I claim—

1. In a fish-hook, a body part, spring-actuated hooks pivoted thereto, means for setting said hooks, a bait-holding rod within and passing through the body part, and having a sheave at its lower end, in combination with the fishing-line connected to the body part and passing around said sheave, and a device on the body part in frictional pressure upon the rod, whereby the hook device is held suspended on the rod, and pulled down thereon by the downward pulling of the fish on the line, and means for tripping the hooks.

2. In a spring-actuated fish-hook and in combination with a suitable body part of spring-actuated hooks pivoted thereto, and a rod on which the body is free to slide and provided with a sheave at its lower end, of the fishing-line secured to said body part and passing downward therefrom around the sheave and upward to the point of surface control, means on the body part for engaging and holding it upon the rod with a force which the pulling of the fish upon the line fastened to the body overcomes, means for setting the hooks and means for releasing the hooks.

3. In a fish-hook and in combination with the fishing-line, of a body part to which the line is connected, spring-actuated hooks pivoted to said body part, and a rod on which the body part is adapted to slide, and having a sheave at its lower end around which the line passes, means for frictionally holding the body part on said rod with sufficient force to counterbalance its weight, means for holding said hooks in position to be sprung upon the fish, and a bait-holder on said rod below the sheave, whereby the pulling movements of the fish is caused to draw upon the line to pull thereby the body part down on said rod to bring its hooks in position to seize the fish, means whereby to trip the hooks in their seizing function.

4. In a fish-hook and in combination with a body part, spring-actuated hooks pivoted thereto, and means for holding said hooks in position to be sprung, of a rod, on which the body part is adapted to slide, having a sheave at its lower end, a case on said rod inclosing said sheave, the fishing-line connected to the body part at one side thereof and passing around the sheave and up through a guide-tube at the opposite side of the body part, and a bait-holder on said rod below the sheave, whereby the body part is caused to slide down on the rod, and means for tripping the hooks to seize the fish in the way described.

5. In a fish-hook and in combination with a bait-holding rod having a sheave at its lower end, of a body part having a center bore and notches in the opposite sides at its upper end, spring-actuated hooks pivoted to said body part and having setting-arms, a tube adapted to slide within the body-bore normally projecting below it and provided with lugs engaging the notches at the upper end of the body part, a spring-pressed cap, loose on the upper end of said tube, and having depending lips for engaging the hook-arms to hold the hooks open, and the fishing-line fastened at one slide of the body part, passing around the sheave and up at the other side of the body, for operation in the way described.

6. In a fish-hook and in combination with a body part having a center bore and notches in its upper end and spring-actuated hooks pivoted thereto and having setting-arms, of a tube adapted to move endwise within said bore, having its bore of angular cross-section and provided with lugs engaging said notches, a spring-pressed cap loose on the upper end of said tube adapted to engage and set the hooks, a bait-holding rod within the tube, of angular cross-section having a length much greater than the body part, and provided with a sheave at its lower end, means on the rod for releasing the hooks, and the fishing-line connected to said body part and passing around the rod-sheave, the said tube being prevented from turning within the tube, the line forming the means by which the body part is pulled down on the rod to cause the hooks to be tripped.

7. In a fish-hook, a bait-holding rod having a sheave at its lower end, in combination with spring-actuated hooks, a body part to which said hooks are pivoted and movable upon said rod, the fishing-line connected to said body part passing under and around the sheave, and up to the surface-controlling point of said line, and a friction-holding device fixed on the body part and engaging by pressure the bait-holding rod, means for setting and means for releasing said hooks, whereby the body with its hooks is pulled down while being frictionally held upon the rod to catch the fish in the way stated.

8. In a fish-hook, a bait-holding rod having a sheave at its lower end, in combination with a body part adapted to slide upon the rod hooks pivoted to said body part, means for retaining them in open position, springs connected to give the hooks their piercing function, means for tripping the hooks and means for frictionally retaining the body part in fixed relation to and upon said bait-holding rod, and the fishing-line connecting the body part and the sheave, whereby the pull of the fish is caused to pull the body part down upon said rod to actuate the means for tripping the piercing-hooks.

9. In a fish-hook, a bait-holding rod, and a housed sheave at the lower end thereof, in combination with a body part adapted to slide upon the rod, spring-actuated hooks pivoted to the body part having arms and shoulders at the pivot-bearings of said hooks, means for setting and means for tripping the hooks consisting of the spring-pressed cap loosely seated on the upper end of the body part and having lips for engaging the hook-arms, a center tube seated in a bore in the body, and on which the cap is seated, springs arranged to engage the shoulders of the hooks, and the fishing-line connected to one side of the body part and passing around the sheave to the other side of said body to the surface-point of control for operation in tripping the hooks in the way stated.

10. In a fish-hook, a bait-holding rod, having a sheave at its lower end, in combination with a body part movable upon said rod, spring-actuated hooks pivoted upon said body part and having arms, a center tube in the body part through which said rod passes a cap having lips, and a spring for maintaining said cap upon the end of said tube, the fishing-line connected to said body part passing under the rod-sheave, and a frictional holding-spring fixed on the body part and engaging the bait-holding rod, means for setting the hooks in engagement with the cap and means for releasing the hooks in the downward movement of the body part upon said rod.

In testimony whereof I affix my signature in presence of two witnesses.

JOSEPH EMERSON DAUGHERTY.

Witnesses:
HARRY P. BLACK,
JAMES H. PLATT.